Aug. 11, 1964
W. GLAMANN
3,143,849
INTERNAL COMBUSTION ENGINES
Filed Feb. 28, 1962
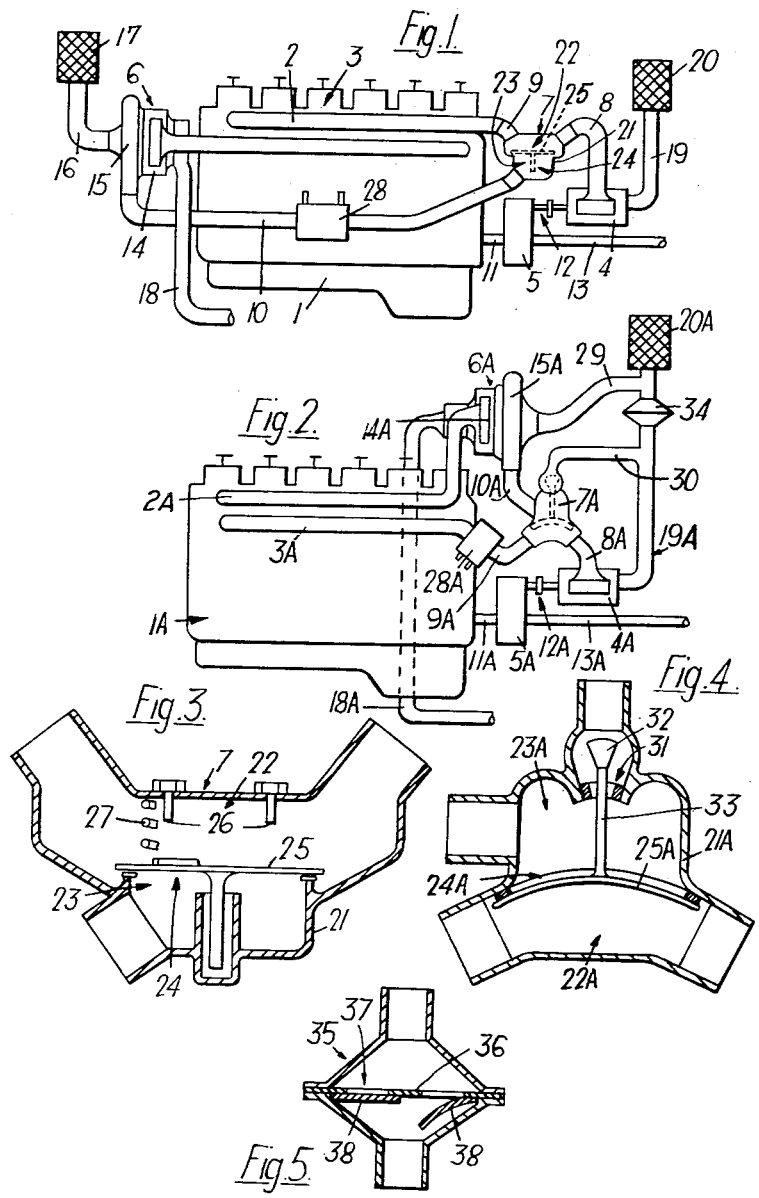
Inventor
By
Attorney

3,143,849
INTERNAL COMBUSTION ENGINES
Wilhelm Glamann, 8 Lehmbacher Weg, Forsbach, Bezirk Cologne, Germany
Filed Feb. 28, 1962, Ser. No. 176,329
4 Claims. (Cl. 60—13)

This invention relates to internal combustion engines and supercharging systems therefor.

According to the present invention I provide an internal combustion engine having an air intake manifold and an exhaust gas manifold, and a system for supercharging the engine with compressed air, said system comprising a first air compressor, a differential gear driven by the engine and in driving connection with the first compressor and with a transmission shaft, a second air compressor connected to the exhaust manifold so as to be driven by engine exhaust gases, a valve comprising a valve body, first, second and third conduits connecting respectively the first compressor, the second compressor and the air inlet manifold to the valve body, a first air passage within the latter connecting the first and third conduits, a second air passage connected to the second conduit and having a common opening within the valve body with the first passage so that both compressors may discharge to the air inlet manifold, and a valve member within the valve body controlling the opening of the second passage into the first passage and closing under a predetermined excess of pressure in the first passage.

The engine may further comprise a port in the valve body open to said second passage in the latter, a branch pipe connecting said port to the air induction pipe of the first compressor, and an auxiliary valve member controlling said port and connected to the first mentioned valve member so as to open said port when the latter closes said common opening and vice versa.

The engine may still further comprise in said air induction pipe intermediate said branch pipe and the air intake end of said induction pipe a further valve closing when said auxiliary valve member opens said port so that air discharged by the second compressor passes to the first compressor for a second stage compression before passing to the air inlet manifold.

Embodiments of the invention will now be described, by way of example, with reference to the accompanying diagrammatic drawing, in which:

FIG. 1 is a side view of one embodiment of an internal combustion engine and supercharging system therefor according to the invention, FIG. 2 is a view corresponding to FIG. 1 showing a second embodiment, FIG. 3 is a cross sectional view to a larger scale of a valve employed in the embodiment shown in FIG. 1, and FIGS. 4 and 5 are cross sectional views to a larger scale of valves employed in the embodiment shown in FIG. 2.

Referring to FIG. 1 of the drawing, an internal combustion engine generally indicated at 1 has an exhaust gas manifold 2, an air inlet manifold 3, and a system for supercharging the engine 1 with compressed air. The supercharging system consists generally of a first air compressor 4 in the form of a positive displacement compressor, a differential gear 5, a second compressor generally indicated at 6, a valve 7, and first, second and third conduits 8, 9 and 10.

The differential gear 5 is driven by the engine 1 through a shaft 11 and has a first output member in driving connection with the compressor 4 through a shaft coupling 12 and a second output member in driving connection with a transmission shaft 13. The compressor 6 is in the form of a turbo-blower having a turbine 14 driven by exhaust gases from the engine 1 through the manifold 2, and a blower 15 having an air induction pipe 16 with an air filter 17. The exhaust gas discharge pipe of the turbine 14 is indicated at 18, and an air induction pipe and an air filter for the compressor 4 are indicated at 19 and 20.

The valve 7 has a valve body 21 and the conduits 8, 9, 10 respectively connect the valve body 21 with the air discharge side of the compressor 4, the air inlet manifold 3 and the air discharge side of the blower 15. The valve 7 has a first passage 22 connecting the conduit 8 with the conduit 9, and a second passage 23 connected to the conduit 10 and having a common opening 24 within the body 21 with the passage 22. The opening 24 is controlled by a valve member 25 which is movable between the closed position in which it is shown and a fully open position in which it is limited by stops 26. A spring 27 urges the valve member 25 to its closed position. An air cooler or heat exchanger 28 is incorporated in the conduit 10 or may be provided in the conduit 8 or 9.

The operation of the supercharging system will now be described.

When the engine 1 is started and runs at high speed under no-load, the compressor 6 draws in air through the filter 17 and pipe 16 and discharges air through the conduit 10. The valve 7 opens under the pressure of air in the conduit 10 and the air passes to the engine 1 through the opening 24, passage 22 and the manifold 3. The compressor 4 does not operate while the developed engine power is low and the oil in the differential gear 5 is cold and there is no load or only a light load on the shaft 13. When a medium load is applied at medium engine speeds to the shaft 13, the compressor 4 begins to operate and delivers air to the engine 1 through the conduit 8, passage 22 of the valve 7 and the manifold 3, so that both compressors 4 and 6 thus supply air to the engine 1. When the engine speed is low and the load is high, the pressure of air in the passage 22 from the compressor 4 exceeds that in the passage 23 from the compressor 6 and at a predetermined excess pressure the valve member 25 closes the opening 24 and shuts off the supply of air to the engine from the compressor 6 while the compressor 4 continues to supply air to the engine 1.

The basic conditions are thus as follows:

(a) At high speed and light load, the compressor 4 is inoperative and the compressor 6 performs all the supercharging.

(b) At medium speed and medium load, both compressors 4 and 6 operate in parallel.

(c) At low speed and high load, the supply to the engine from the compressor 6 is cut off and the compressor 4 performs all the supercharging.

The engine thus has a high charging pressure and high torque at low engine speeds under load, the torque rapidly falling with increasing operating engine speed.

The copious discharge of exhaust gases to the compressor 6 leads to an early initial effective participation of the compressor 6, and when the valve 7 is open and both compressors 4 and 6 are operating, the charging pressure is governed by the compressor 4 and depends on the torque value set by the driver of the engine. The delivery and operating speed of the compressor 6 adjust themselves according to the characteristic curve of the compressor 6.

The higher the engine speed is, the wider the valve 7 opens, and the greater the proportion of charging air delivered by the compressor 6 is. Consequently, as the engine speed increases, the speed of the compressor 4 becomes increasingly lower until the compressor 4 eventually stops operating and the charging air is supplied to the engine 1 only by the compressor 6. Excess charging air may then pass through the conduit 8 to the compressor 4 so that the latter is driven in reverse and operates as a prime mover for the first output member of the differential gear 5 which then thus acts as a booster gear for the main shaft 11 of the engine.

Should the compressor 6 fail, the compressor 4 automatically comes into operation to supply the whole air charge required, and if the compressor 4 fails, the compressor 6 supplies sufficient charging air at least at higher engine speeds.

The embodiment shown in FIG. 2 of the accompanying drawing will now be described, like parts in relation to FIG. 1 being indicated by like references with the addition of the letter A.

Referring to FIG. 2, an engine 1A of a larger type than the engine 1 of FIG. 1 has an exhaust gas manifold 2A, an air inlet manifold 3A and a supercharging system. The latter consists of a first air compressor 4A driven by a differential gear 5A, a second compressor 6A driven by the engine exhaust gases and having a turbine 14A and a blower 15A, a valve 7A and conduits 8A, 9A and 10A. The gear 5A is driven from the engine by a shaft 11A and has a first output member driving the compressor 4A through a coupling 12A, and a second output member driving a transmission shaft 13A. The turbine 14A has an exhaust gas discharge pipe 18A, and the compressor 4A has an air induction pipe generally indicated at 19A and an air induction pipe generally indicated at 19A and an air filter 20A. The valve 7A has a body 21A connected respectively by the conduits 8A, 9A, 10A to the compressor 4A, the air intake manifold 3A and compressor 6A, and has passages 22A, 23A, an opening 24A between these passages and within the body 21A and a valve member 25A controlling the opening 24A.

As so far described, the supercharging system shown in FIG. 2 corresponds generally to that shown in FIG. 1 except that the compressor 6 is located at the rear of the engine 1 and has no separate air induction pipe, and the air cooler or heat exchanger is located in the air intake manifold.

The FIG. 2 embodiment now differs from the FIG. 1 embodiment as follows. The air induction pipe 19A serves both compressors 4A and 6A being branched adjacent its intake or upper end to the compressor 6A by a pipe 29. Intermediate its branch pipe 29 and its connection to the compressor 4A, the pipe 19A has a second branch pipe 30 connected to a port 31 in the body 21A of the valve 7A. The port 31 is controlled by an auxiliary valve member 32 which is connected to the valve member 25A by a rod 33 so that, when the valve member 25A is in its closed position the valve member 32 is in its open position as shown, and vice versa. A valve 34 is provided in the pipe 19A between the branch pipes 29 and 30. The valve 34 (FIG. 5) consists of a hollow body 35 divided by a plate 36 having slots 37 closed by leaf springs 38 on the underside of the plate which move to an open position when the air pressure on the upper side of the springs 38, that is the air intake side, is greater than that on its lower or output side. In FIG. 5, one of the springs 38 is shown in an open position.

When the valve member 25A is in its closed position, the valve 34 is also closed, and air from the compresor 6A is by-passed to the manifold 3A through the opening 31, the pipe 30 and the pipe 19A to the input side of the compressor 4A, so that a two-stage supercharge is obtained, the compressor 6A effecting the first supercharge stage and the compressor 4A effecting the second supercharge stage. The closed valve 34 prevents escape of air to atmosphere through the air filter 20A.

When the delivery of the air from the compressor 6A to the valve 7 rises above a predetermined level, its charging pressure increases due to a throttling action by the valve member 32, so that the latter closes and the valve member 25A opens, so that both compressors 4A and 6A then operate in parallel as distinct from two-stage or series operation. That is to say, the compressor 6A discharges through the opening 24A to the inlet manifold 3A, and the compressor 4A discharges through the passage 22A and draws in air through the valve 34.

In the FIG. 2 embodiment there are thus the following basic conditions of operation:

(a) At high speed and light load, the compressor 4A is inoperative and the compressor 6A performs all the supercharging.

(b) At medium speed and medium load, both compressors 4A and 6A operate in parallel.

(c) At low speed and high load, both compressors 4A and 6A operate in series giving two-stage compression, the compressor 6A delivering to the compressor 4A.

The transition from series to parallel operation of the compressors 4A and 6A may also be effected by briefly interrupting the fuel flow, that is to say throttling back, since at that instant the charging pressure in the delivery pipe of the compressor 6A collapses, while the delivery pressure in the delivery pipe 10A is for that instant not effected.

In the FIG. 1 embodiment, the valve 7A shown may be replaced by any other suitable type of valve such as a valve the same as or equivalent to the valve 34 in FIG. 2.

In the FIG. 2 embodiment, if the valve 34 is omitted and the valve member 25A is in its open position, excess air delivered to the valve 7A by the compressor 6A passes through the conduit 8A to the compressor 4A in a similar manner to that described with reference to FIG. 1 so that the differential gear 5A acts as a booster gear.

With parallel operation of the two compressors, the provision for automatic throttling of the first or gear driven compressor, for which the power required is a power loss in the total power balance, enables said power loss to be reduced so that overall efficiency may be economically increased. The output of the system is independent of the efficiency of the second or gas driven compressor which may fluctuate according to operating conditions, especially operating temperatures. Also, the incorporation of the second compressor may be effected without disturbing the somewhat complicated equilibrium adjustment of the differential super-charging arrangement.

Since, in the case of differential supercharging, the first compressor is entirely independent of the engine speed, the invention also offers the following advantages.

During starting when the output of the second compressor is as yet insufficient, the principal quota of supercharging air is provided by the first compressor which runs at a high speed, since it is unrestricted in its r.p.m. With progressively increasing output of the second compressor, its percentage of the total supercharging air delivered increases, and the first compressor now slows down in the same proportion and this slowing-down may progress to a complete stoppage. In addition, in particularly favourable running conditions, the output of the second compressor may increase to such an extent, that its excess is sufficient to provide a working medium for the first compressor which then acts as an auxiliary power source, by vitrue of its operation as an air motor. The excess output of the turboblower acts through the differential gear, now working as a booster gear, on the driving shaft so as to provide additional power on the engine power shaft. This latter condition results in favourable efficiency figures for all the components involved. In every case, however, the system according to the present invention provides an automatically-acting, continuous and reciprocal alternation between the working of the two compressors so that, depending on the efficiency and running conditions of the second compressor, more or less of the charge is economized, by a power feedback in the form of a coresponding increase in the speed of the power shaft, The output of the whole power unit is made independent of the efficiency of the second compressor, since the first compressor of its own accord always runs at as high a speed as is necessary to compensate for any deficiency in the delivery of the second compressor.

The characteristic of an exhaust-gas turboblower, especially in the case of a cheap mass-produced one, to lose efficiency rapidly in the case of fouling, temperature or altitude changes, by a negative chain reactin, is now compensated by a relatively small, additional air boost, by means of which a positive chain reaction is initiated, and the engine and supercharging system prevented from becoming overheated. A relatively small positive displacement compressor, and a cheap mass-produced turboblower may be used.

I claim:

1. In combination with an internal combusion engine having an air intake manifold and an exhaust gas manifold, a transmission shaft, and a differential gear driven by the engine and in driving connection with the transmission shaft, a system for supercharging the engine with compressed air comprising a first air compressor connected to be driven by said differential gear whereby the amount of compressed air supplied by said first compressor increases with decreasing engine speed and increasing load on said transmission shaft, a second air compressor connected to be driven by the exhaust gases from said exhaust gas manifold whereby the amount of compressed air supplied by said second compressor increases with increasing engine speed, first conduit means for conducting compressed air from said first compressor to said air intake manifold, second conduit means for conducting compressed air from said second compressor to said air intake manifold, and valve means responsive to the pressure of the air in said first conduit means for closing said second conduit means when the air pressure in said first conduit means is above a predetermined level and for opening said second conduit means when the air pressure in said first conduit means falls below said predetermined level.

2. In combination with an internal combustion engine having an air intake manifold and an exhaust gas manifold, a transmission shaft, and a differential gear driven by the engine and in driving connection with the transmission shaft, a system for supercharging the engine with compressed air comprising a first air compressor connected to be driven by said differential gear whereby the amount of compressed air supplied by said first compressor increases with decreasing engine speed and increasing load on said transmission shaft, an air induction pipe for supplying air to said first compressor, a second air compressor including a turbine connected to be driven by the exhaust gases from said exhaust gas manifold whereby the amount of compressed air supplied by said second compressor increases with increasing engine speed, an air induction pipe for supplying air to said second compressor, and valve means connected to said air intake manifold of the engine and first and second conduit means for conducting compressed air from said first and second compressors, respectively, to said valve means, said valve means being adapted to close said second conduit as long as the pressure of air from said first conduit is above a predetermined level and to open said second conduit when the pressure of air from said first conduit falls below said predetermined level.

3. The combination of claim 2 which includes branch conduit means for conducting compressed air from said second conduit means to the air induction pipe for said first compressor, and an auxiliary throttling valve for opening said branch conduit upon the closing of said valve means and for closing said branch conduit upon the opening of said valve means.

4. In combination with an internal combustion engine having an air intake manifold and an exhaust gas manifold, a transmission shaft, and a differential gear driven by the engine and in driving connection with the transmission shaft, a system for supercharging the engine with compressed air comprising a first air compressor connected to be driven by said differential gear whereby the amount of compressed air supplied by said first compressor increases with decreasing engine speed and increasing load on said transmission shaft, a second air compressor including a turbine connected to be driven by the exhaust gases from said exhaust gas manifold whereby the amount of compressed air supplied by said second compressor increases with increasing engine speed, a single air induction pipe having a first branch pipe for supplying air to said first compressor and a second branch pipe for supplying air to said second compressor, a control valve connected to said air intake manifold of the engine and first and second conduit means for conducting compressed air from said first and second compressors, respectively, to said control valve, said control valve being responsive to the air pressure in said first conduit so that it closes said second conduit as long as the air pressure in said first conduit is above a predetermined level and opens said second conduit when the air pressure in said first conduit falls below said predetermined level, branch conduit means for conducting compressed air from said second conduit means to the first branch pipe for supplying air to said first compressor, and an auxiliary throttling valve for opening said branch conduit upon the closing of said control valve and for closing said branch conduit upon the opening of said control valve, and valve means in said first branch of the air induction pipe between the intake end of said first branch and said branch conduit means for closing the intake end of said first branch pipe when said throttling valve is opened and for opening the intake end of said first branch pipe when said throttling valve is closed.

References Cited in the file of this patent

UNITED STATES PATENTS

| | | |
|---|---|---|
| 2,303,794 | Pateras Pescara | Dec. 1, 1942 |
| 2,567,486 | Johansson | Sept. 11, 1951 |
| 2,628,015 | Neugebauer et al. | Feb. 10, 1953 |
| 3,050,932 | Mueller | Aug. 28, 1962 |